US012576946B2

(12) United States Patent　　(10) Patent No.:　US 12,576,946 B2
Braedt et al.　　　　　　　　　　(45) Date of Patent:　Mar. 17, 2026

(54) BICYCLE TORQUE SENSOR

(71) Applicant: SRAM DEUTSCHLAND GmbH, Schweinfurt (DE)

(72) Inventors: Henrik Braedt, Dittelbrunn (DE); Sebastian Heyna, Dittelbrunn (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 927 days.

(21) Appl. No.: 17/725,724

(22) Filed: Apr. 21, 2022

(65) Prior Publication Data

US 2022/0340231 A1　　Oct. 27, 2022

(30) Foreign Application Priority Data

Apr. 21, 2021　(DE) ..................... 10 2021 002 093.6
Apr. 19, 2022　(DE) ..................... 10 2022 109 482.0

(51) Int. Cl.
　*B62M 6/50*　　(2010.01)
　*B62J 45/411*　(2020.01)
　*B62J 45/42*　　(2020.01)

(52) U.S. Cl.
CPC .............. B62M 6/50 (2013.01); B62J 45/411 (2020.02); B62J 45/42 (2020.02)

(58) Field of Classification Search
CPC ... B62M 6/50; B62M 6/55; B62J 45/42; B62J 45/411; B62J 45/421
See application file for complete search history.

(56) References Cited

U.S. PATENT DOCUMENTS

| | | | |
|---|---|---|---|
| 2019/0187008 A1* | 6/2019 | Schanz | G01L 3/105 |
| 2020/0063793 A1* | 2/2020 | Rossberger | B62M 11/145 |
| 2023/0179062 A1* | 6/2023 | Kraft | H02K 5/1732 |
| | | | 310/68 B |

FOREIGN PATENT DOCUMENTS

| | | |
|---|---|---|
| CN | 109661565 | 4/2019 |
| CN | 211599454 U | 9/2020 |
| DE | 102009029653 | 3/2011 |
| DE | 102013011504 | 1/2014 |
| DE | 102014016719 | 5/2016 |
| DE | 202014010823 | 10/2016 |
| DE | 102016120544 | 5/2018 |
| DE | 102018200061 | 7/2019 |
| EP | 2216242 | 8/2010 |

* cited by examiner

*Primary Examiner* — Jason D Shanske
*Assistant Examiner* — Al-Birr Rahman Chowdhury

(57)　　　　　ABSTRACT

An electric bicycle drive unit for arrangement in a bottom bracket region of a bicycle frame, coaxially to the bottom bracket, is provided. The drive unit includes a torque sensor device for measuring a rider total torque. Rider total torque may include left-hand rider torque and a right-hand rider torque. The drive unit may include a bottom bracket shaft, an electric motor device arranged coaxially to the bottom bracket shaft, a hollow output shaft for transmitting a motor torque and the rider total torque to a bicycle drivetrain, and a rider moment coupling device for coupling the rider torque from the bottom bracket shaft to the hollow output shaft, and a motor torque coupling device for coupling the motor torque to the hollow output shaft. A torque measurement device is also provided.

8 Claims, 9 Drawing Sheets

1

2

$S_E$ $T_L$ $C_{GA}$ $D_U$ $M_{EA}$ $S_B$ $A_B$ $C_P$ $R_C$

3

6

5

$A_R$

4

BICYCLE TORQUE SENSOR

PRIORITY

This application claims priority to, and/or the benefit of, German patent application DE 10 2021 002 093.6, filed on Apr. 21, 2021, and DE 10 2022 109 482.0, filed on Apr. 19, 2022, the contents of which are included by reference herein in their entirety.

FIELD

The present invention relates to an electronic bicycle drive unit and/or a torque measuring device.

BACKGROUND

Off-road bicycles with electric power assistance are becoming increasingly popular. These bicycles, also known as e-mountain bikes or E-MTBs for short, are divided into categories such as "cross-country", "trail", "enduro" and "downhill" and are also used for sporting purposes.

Such applications place high demands on the robustness, frame rigidity and "handling" of the E-MTB. When handling the E-MTB, the center of gravity of the bicycle is of particular importance. A high center of gravity of the bicycle impairs cornering and increases the risk of rolling over in the event of strong braking deceleration or in steep downhill sections.

The distance between the bicycle's center of gravity and the rear wheel axle is also of particular importance. The further forward the center of gravity of the bicycle is in the direction of travel, the higher the risk of rolling over and the more difficult it becomes for the rider to lift the front wheel, especially in cases without the assistance of drive torque.

Lifting the front wheel is one of the most important riding techniques used in a wide variety of riding situations. In this way, larger obstacles and steps can be overcome, or bumps can be ridden over at high speed.

Furthermore, the distance between the rear-wheel axle and the bottom bracket shaft on e-mountain bikes tends to be larger than on mountain bikes without an auxiliary drive, since the electric motor also takes up installation space in the region of the bottom bracket shaft, and since there is therefore less radial clearance available for the rear wheel tire.

On full-suspension bicycles, the electric auxiliary drive also affects the installation space for the bridge between the chainstays of the rear frame in the region of the bottom bracket, this bridge usually being required for stability reasons. Depending on the rear kinematics used for the rear suspension, there may also be a conflict of installation space with rear suspension pivot joints located in the bottom bracket region.

Furthermore, e-mountain bikes and, more generally, other bicycle models with an electric auxiliary drive that assists the rider, also known as pedelecs in the market, require the rider's input power to be measured for motor control. The motor should only assist the rider's power with an appropriate multiplier. For legal as well as safety reasons, the electric motor also should not have a driving effect without torque applied by the rider via the pedals.

For e-mountain bikes, a fast and accurate measurement of the torque applied by the rider is of particular importance, since many off-road riding situations require a fast reaction time and good controllability of the drive.

SUMMARY

An electric bicycle drive unit for arrangement in a bottom bracket region of a bicycle frame, coaxially to the bottom bracket, is provided. The drive unit includes a torque sensor device for measuring a rider total torque. Rider total torque may include left-hand rider torque and a right-hand rider torque. The drive unit may include a bottom bracket shaft, an electric motor device arranged coaxially to the bottom bracket shaft, a hollow output shaft for transmitting a motor torque and the rider total torque to a bicycle drivetrain, and a rider moment coupling device for coupling the rider torque from the bottom bracket shaft to the hollow output shaft, and a motor torque coupling device for coupling the motor torque to the hollow output shaft.

A torque measurement, or sensor, device is also provided. The torque sensor device may be arranged in an axial region of the drive unit. The axial region of the drive unit may be defined by a hollow output shaft portion. The axial region may be configured to communicate both the rider total torque and the motor torque.

BRIEF DESCRIPTION OF DRAWINGS

In the figures.

Other aspects and advantages of the embodiments disclosed herein will become apparent upon consideration of the following detailed description, wherein similar or identical structures have similar reference numerals.

Figure 1:
FIG. 1: shows an e-mountain bike according to prior art in a side view on the drive side.

It is noted that the figures are simplified and schematic illustrations that are intended to illustrate mainly principles of the invention(s). In order not to clutter the figures, reference signs are not always provided for all of the features in each illustration, but rather primarily only for those features that are required for explaining the particular figures. This applies in particular if it is apparent that a plurality of identical elements are provided in the same figure.

Identical or mutually corresponding features of different exemplary embodiments are each provided with the same reference signs, and the various exemplary embodiments are primarily explained only to the extent that they differ from the first exemplary embodiment in each case, to the description of which reference is otherwise made.

Unless explicitly stated otherwise, directional terms such as front, rear, top, bottom, left and right relate, in the present application, to directions as are apparent to a cyclist who is sitting in a conventional manner on a bicycle that is equipped with the bicycle actuating device and is standing or travelling on a horizontal underlying surface.

DETAILED DESCRIPTION

An electric bicycle drive unit for arrangement in a bottom bracket region of a bicycle frame, coaxially to the bottom bracket, is provided. The drive unit includes a torque sensor device for measuring a rider total torque. Rider total torque may includes left-hand rider torque and a right-hand rider torque. The drive unit may include a bottom bracket shaft, an electric motor device arranged coaxially to the bottom bracket shaft, a hollow output shaft for transmitting a motor torque and the rider total torque to a bicycle drivetrain, and a rider moment coupling device for coupling the rider torque from the bottom bracket shaft to the hollow output shaft, and a motor torque coupling device for coupling the motor torque to the hollow output shaft.

A torque measurement, or sensor, device is also provided. The torque sensor device may be arranged in an axial region of the drive unit. The axial region of the drive unit may be defined by a hollow output shaft portion. The axial region may be configured to communicate both the rider total torque and the motor torque.

In the following description, location and direction references such as "left", "right", "front", "back", "up", "down", etc. correspond to the rider's perspective on a bicycle.

Torque measurement using strain gauges and non-contact magnetostrictive torque measurement have become established on the market. In order to avoid the need for sliding contacts when measuring with strain gauges, which is carried out on a rotating shaft through which torque flows, the energy supply to the strain gauge sensor is usually inductive, and the signal transmission from the sensor to the evaluation electronics is then also wireless.

In the case of mid-mounted motors that are not concentric to the bottom bracket shaft, which currently dominate the e-mountain bike market for the most part, the torque of the electric motor is transmitted from a motor shaft parallel to the bottom bracket shaft to the hollow output shaft of the drive unit and thus to the chainring of the bicycle drivetrain. This torque transmission from the electric motor to the hollow output shaft often takes place by means of a spur gearing or via a toothed belt. In such a setup, a device for torque measurement can be easily placed in the drive unit in such a way that only the torque applied by the rider is measured, regard-less of the actual motor torque.

For this purpose, the motor torque is introduced into a hollow output shaft between the region of the rider torque measurement and a chainring connection region, i.e. downstream of the rider torque measurement in terms of torque flow, whereby the rider torque measurement is not falsified by the motor torque.

The disadvantage of such non-concentric mid-mounted motor drive units is that the drive unit has a large extent perpendicular to the motor axis or the bottom bracket shaft, at least in one direction. The extent in the direction of the motor axis or bottom bracket shaft is also considerable since reduction gearings or transmission gearings to the bottom bracket shaft require installation space in addition to the width of the motor. This results in a drive unit that is usually not very compact and often jagged. This makes it difficult to optimally integrate the drive unit into the bicycle frame.

Mid-mounted motor drive units arranged concentrically to the bottom bracket shaft can be made more compact and thus better integrated into the bicycle frame. An example of a drive unit of this design is known in the trade as TQ HPR 120s, as well as from document DE202014010823U1 (hereinafter abbreviated as DE'823).

Despite the compact design, however, this mid-mounted motor still achieves dimensions that make integration into modern e-mountain bikes difficult to some extent. In particular, the outer diameter of the drive housing of this drive unit of approx. 140 mm is partly problematic since a housing diameter of this size can lead to installation space conflicts in bi-cycle frames with a short chainstay length (in particular 470 mm and less) as well as in common wheel sizes (27.5 inches or 29 inches).

To ensure sufficient radial clearance for the rear wheel, the outer diameter of a mid-mounted rotor concentric to the bottom bracket shaft should ide-ally not exceed 100 mm. Too large an outer diameter of the mid-mounted motor can also make it difficult to position the pivot points that are close to the bottom bracket on sprung bicycle frames and are important for the characteristics of the rear suspension.

In the aforementioned, known concentric drive unit, the device for measuring the rider torque makes a significant contribution to the relatively large housing diameter. This known concentric drive unit uses a sensor unit provided for example by NCTE AG for magnetostrictive measurement of the rider torque. With this sensor unit, the rider torque is measured on a hollow torsion measuring shaft that surrounds the bottom bracket shaft and is specially provided for the measurement.

For this purpose, the hollow torsion measuring shaft is connected to the bottom bracket shaft at one axial end in a torque-proof manner. At its other axial end, the hollow torsion measuring shaft is free to rotate relative to the bottom bracket shaft but is connected to a hollow output shaft of the drive unit with a fixed rotation direction via a freewheel in the direction of rotation.

With this known arrangement, the torque applied by the rider to both pedals or crank arms can be measured in isolation from the motor torque and any bending moments. As already mentioned at the outset, the motor torque in this drive unit, with regard to the torque flow, is only introduced into the hollow output shaft of the drive unit downstream of the torque measurement. In this case, the device for torque measurement is located radially inside the motor and gearing.

However, this known arrangement for measuring the rider torque leads to a comparatively large overall diameter of the drive unit, in particular due to the hollow torsion measuring shaft additionally required for the measurement. Due to the thus also increased diameter of a plurality of assemblies of the drive unit, including increased shaft diameters and correspondingly large bearing diameters, there is a correspondingly significantly increased weight of the drive unit. Lastly, the cable routing from the torque measuring device to the electronic motor controller in this drive unit tends to be complex and thus partly problematic.

Proceeding from this prior art, it is an object of the present invention to provide an electric bicycle drive unit with which the disadvantages de-scribed above can be overcome. In particular, it is intended to be made possible to measure the rider's torque in the case of a bicycle mid-mounted motor concentric with the bottom bracket, which permits a smaller radial size of the drive unit.

This object is achieved by an electric bicycle drive unit for arrangement in a bottom bracket region of a bicycle frame, coaxially to the bottom bracket, with the features as described herein.

In accordance with the genus, the drive generically comprises a torque sensor device for measuring a rider total torque consisting of a left-side rider torque and a right-side rider torque, a bottom bracket shaft, an electric motor device arranged coaxially to the bottom bracket shaft, a hollow output shaft for transmitting the motor torque and the rider torque to a bi-cycle drivetrain, and a rider moment coupling device for coupling the rider torque from the bottom bracket shaft to the hollow output shaft and a motor torque coupling device for coupling the motor torque also to the hollow output shaft.

The coupling devices for the rider torque and for the motor torque are usually each freewheels, for example sprag freewheels. However, for specific applications, coupling devices rotationally rigid in both directions or switched clutches are also conceivable.

Depending on the design of the electric motor, a generic drive unit usually also comprises a reduction gearing for transmitting the assisting motor torque to the bottom bracket shaft, although gearless drive units for directly driving the bottom bracket shaft are also known.

According to the present disclosure, the drive unit is characterized in that the torque sensor device is arranged in an axial region of the drive unit which is defined by a portion of the hollow output shaft and is traversed by the hollow output shaft, the axial region being passed through by both the rider total torque and the total motor torque during operation of the drive unit.

In other words, this means that, thanks to the devices and/or techniques described herein, the rider torque can be measured at the hollow output shaft. This positioning of the rider torque measurement, which is known from the prior art for non-concentric mid-mounted motors, was previously not applicable for generic drive units concentric with the bottom bracket, since a motor or transmission hollow output shaft there basically encloses the hollow output shaft of the drive unit for reasons of geometry, at least in the region in which only the rider torque and not yet the motor torque acts on the hollow output shaft. Direct access to the shaft carrying the rider torque to be measured was there-fore not possible until now.

According to an embodiment of the invention, the rider moment coupling device is arranged in the axial region as well as radially inside the hollow output shaft. In this case, the torque sensor device is set up to detect a change in diameter or a circumferential stress of the hollow output shaft in the hollow output shaft portion and/or a change in diameter or circumferential stress of the rider moment coupling device in the region of the hollow output shaft portion.

For this purpose, for example, co-rotating strain gauges can be arranged on an outer diameter of the hollow output shaft in the region of the hollow output shaft portion, or the measurement can be carried out by magneto-strictive or magnetoelastic determination of the circumferential stress of the hollow output shaft, i.e. the material stress in the circumferential di-rection of the hollow output shaft.

In the event that, instead of a change in diameter or circumferential tension of the hollow output shaft, a change in diameter or circumferential tension of the rider moment coupling device is to be determined through the hollow output shaft, the hollow output shaft can be of a material permeable to magnetic field lines or magnetic fields made for this purpose, for example of aluminum, and in particular can be thin-walled, at least in the hollow output shaft portion.

This embodiment makes use of the fact that the rider moment coupling device, in particular if it is designed as a freewheel, for example as a sprag roller freewheel, expands elastically radially when acted upon by the rider torque, with this expansion also being communicated to the hollow output shaft portion within which the rider moment coupling device is located. This radial elastic expansion and the associated increase in diameter lead to material stresses particularly in the circumferential direction in the rid-er moment coupling device and in the hollow output shaft portion.

These material stresses running particularly in the circumferential direction are superimposed by shear stresses in the hollow output shaft portion, these stresses being caused by the motor torque. However, due to the physical super-position principle, the tensile stresses and the shear stress-es running in the circumferential direction do not influence each other, at least not to first order or approximation, but are independent of each other. In this way, it is therefore possible to measure the rider total torque in the hollow output shaft portion independently of the motor torque.

According to a further embodiment of the invention, the drive unit comprises a hollow gear or motor output shaft arranged between the motor device and the motor torque coupling device, the hollow gear or motor output shaft being arranged in the axial region coaxially to the hollow output shaft portion and radially outside the hollow output shaft portion and is configured to be permeable to magnetic fields, the torque sensor de-vice being designed for contactless detection of the rider total torque in the hollow output shaft portion. For the most accurate measurement possible of the rider total torque, the motor hollow output shaft may be configured to be as thin-walled as possible in the axial region.

Thus, in this embodiment, the motor torque is passed through the axial region separately from the rider torque, more specifically by means of the hollow motor output shaft, and the rider torque is determined by contact-less measure-ment of the material stresses in the hollow output shaft portion through the hollow motor output shaft.

The material stresses in the hollow output shaft portion can be measured by a contactless strain gauge arrangement, or by contactless magnetostrictive or magnetoelastic mea-surement.

According to a further embodiment, the rider total torque is measured by determining the difference between a total torque measured by the torque sensor device in the hollow output shaft portion and the motor torque. The motor torque can be measured separately in the motor. In an embodiment, however, the motor torque is calculated on the basis of the electric current or power absorbed by the motor and then subtracted from the measured total torque.

The invention is in principle independent of the design of the motor device, i.e. independent of the type of electric motor as well as independent of any reduction gearing contained in the motor device and also of its structural design.

According to a further embodiment of the invention, it may be provided that the motor device comprises a cycloidal gear unit or expansion shaft gear unit, the latter also being known as a harmonic drive. Such gear units have in par-ticular the advantage of realizing very high transmission ratios in only one gear stage, while at the same time having extremely compact dimensions and a high torque load capacity.

In the following, embodiments of the invention are described by way of example with reference to the figures.

FIG. 1 shows a mountain bike with an electric auxiliary drive according to the prior art. The mountain bike has a frame 1 with a rear end 2 with suspension. The drivetrain 3 of the mountain bike comprises a bottom bracket assembly AB with a bottom bracket shaft SB, a chainring RC, a rear derailleur 4, a multiple sprocket cassette 5 arranged by the rear-wheel axle AR and a drive chain 6.

Furthermore, the mountain bike is equipped with an electric drive unit DU which assists the rider, and is designed as a so-called mid-mounted motor, i.e. is arranged in the region of the bottom bracket assembly AB, and which comprises an electric motor device MEA according to prior art. An energy storage device SE is assigned to the drive unit DU.

The energy storage device SE for driving the motor device MEA of the drive unit DU is arranged in the lower tube TL of the bicycle frame 1. Due to the positioning of the motor device MEA and the energy storage device SE in front of and above the bottom bracket shaft SB, which results in a common center of gravity CG of the drive unit DU and the energy storage device SE as shown in FIG. 1, it is clear that the center of gravity of the bicycle is shifted relatively far upwards and forwards by these assemblies, which have a considerable mass, with the disadvantages with regard to handling and riding safety described in the introduction to the description.

Figure 2:
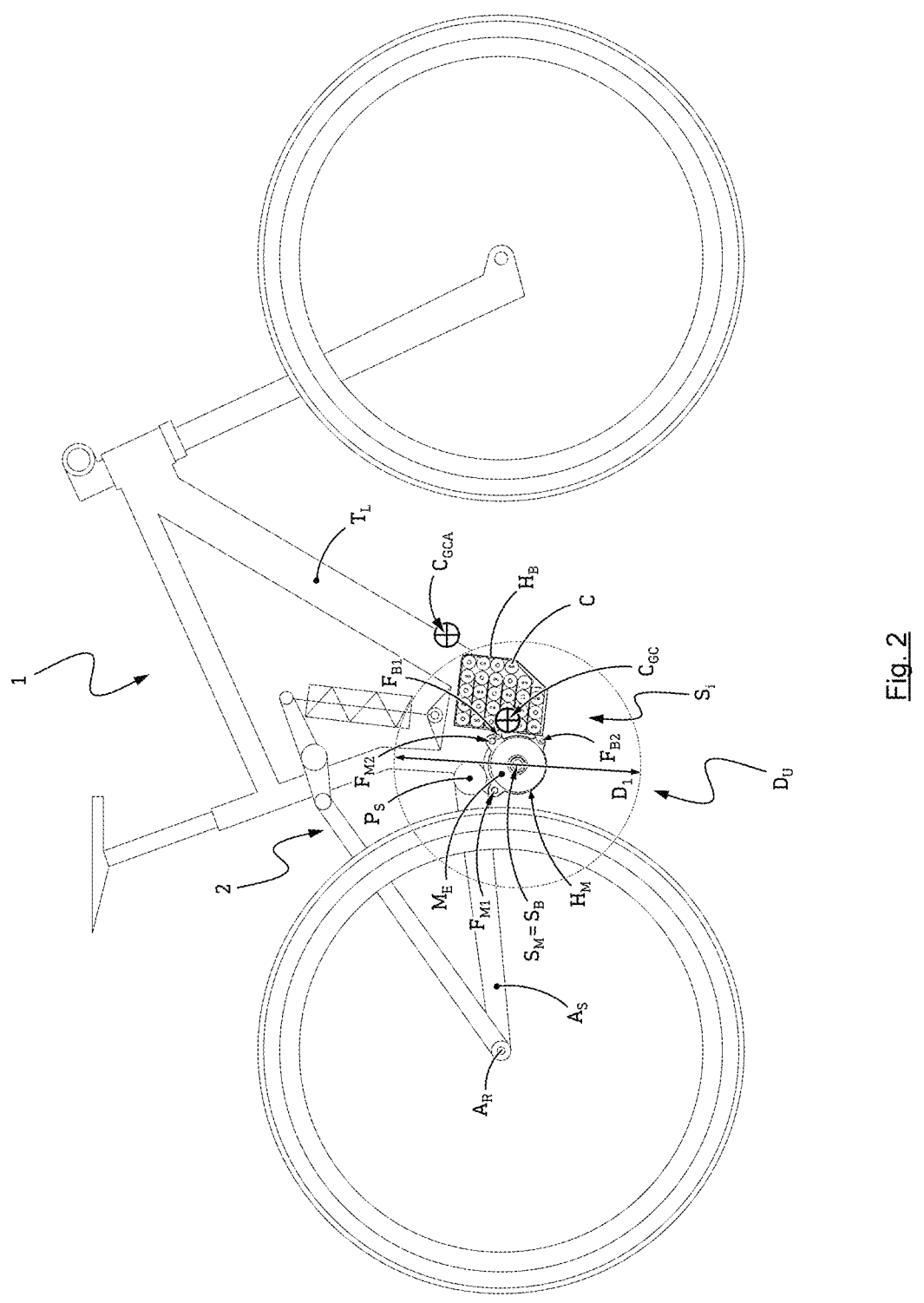
FIG. 2: shows, in a view corresponding to FIG. 1 and in schematic representation, an e-mountain bike with an embodiment of a drive unit according to the present disclosure.

FIG. 2 shows a schematic representation of the main assemblies and components of an e-mountain bike, which is equipped with an embodiment of a drive unit DU according to the present disclosure.

In addition to the schematized representation of most of the components, for the sake of simplicity and better clarity, FIG. 2 also does not show the drivetrain 3 as shown in FIG. 1, nor the parts of the wheel suspensions located, relative to the drawing sheet, in front of a longitudinal center plane of the bicycle.

The motor housing HM, and thus also the battery housing HB of the energy storage device SE attached to the motor housing HM, is connectable or connected to the frame 1 at two frame interfaces or fixture pins FM1 and FM2. The energy storage device SE or the battery housing HB is connected to the motor housing HM by means of two fixture points or fixture pins FB1 and FB2.

This eliminates the need for the additional fastening interfaces between the energy storage device SE and the bicycle frame 1 required in the prior art as shown in FIG. 1, which results in a reduction in complexity, weight, and costs. As an alternative to the illustration in FIG. 2, the energy storage device SE can also be arranged together with the other assemblies of the drive unit DU in a single common housing.

Compared to FIG. 1, it is clear that the center of mass CG of the coaxial drive unit DU is considerably lower in the bicycle and considerably further to the rear than in the case of non-coaxially designed and arranged drive units, which means that the disadvantages described in the introduction to the description, particularly with regard to handling and riding safety, can be mitigated.

The use of a drive unit DU, which is coaxial to the bottom bracket shaft SB and in which the longitudinal axis of the motor shaft SM thus coincides with the longitudinal axis of the bottom bracket shaft SB, also enables a particularly compact design of the drive unit DU, so that, compared to a non-coaxial drive unit such as that shown in FIG. 1, installation space that becomes free in the bottom bracket region D1 can be used for other components, in the present case in particular for the energy storage device SE with the battery cells C contained therein, as well as for the pivot shaft PS or connection of the rear swingarm AS.

Also, the chain stay length or the distance between the rear-wheel axle AR and the bottom bracket shaft SB can be kept desirably short, especially in diameter, due to the very compact, coaxial drive unit DU and there is sufficient radial clearance in the bottom bracket region D1 for the rear tire.

Figure 3:
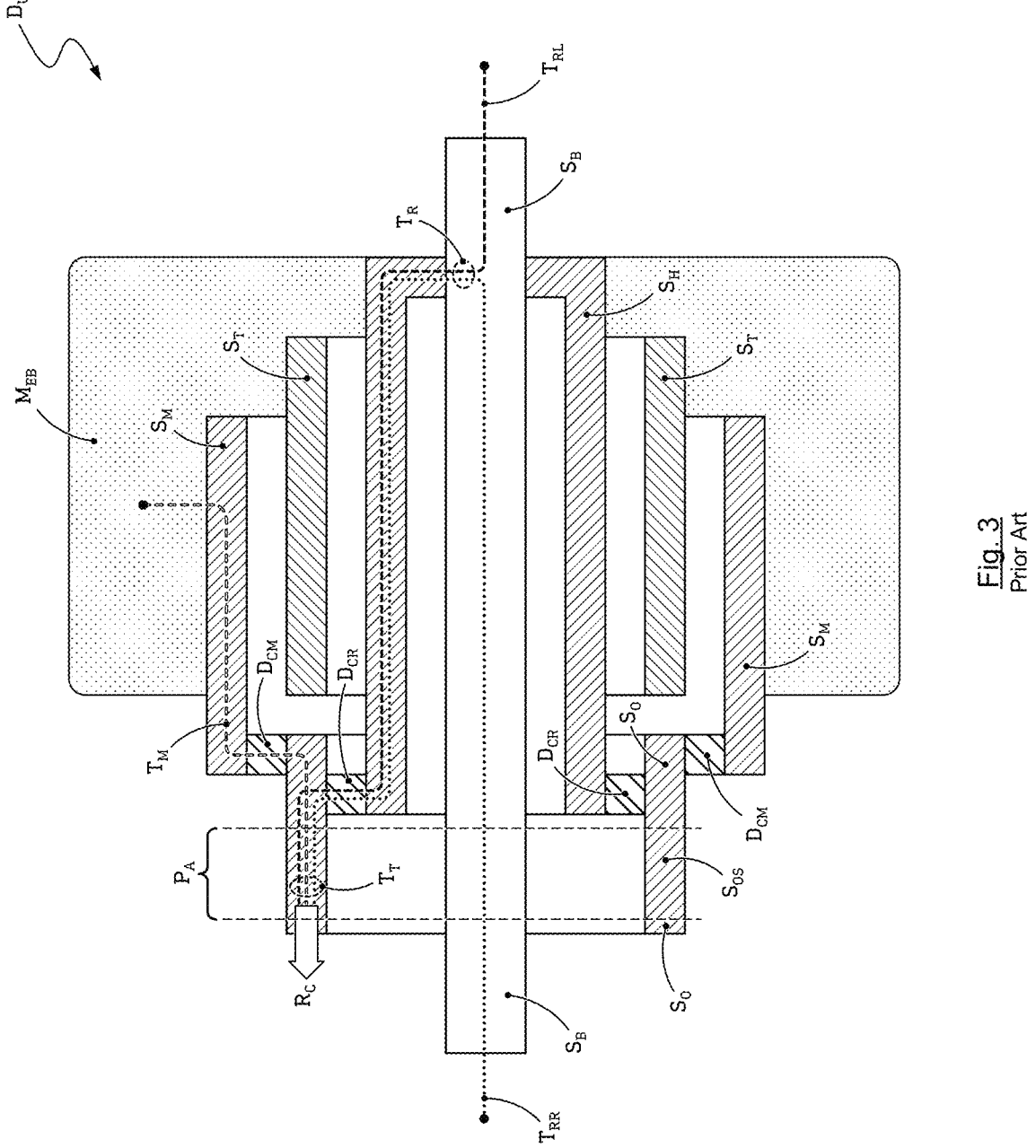
FIG. 3: shows a highly schematized representation of the operating principle of a drive unit known from prior art, which is coaxial to the bottom bracket, in a longitudinal section.

FIG. 3 shows a very highly schematized illustration of an example of a drive unit DU known from the prior art, which is coaxial to the bottom bracket, with a motor device MEB, usually comprising a gearbox, in longitudinal section. The functional principle shown in FIG. 3, in particular for measuring the rider torque TR, corresponds, for example, to the drive unit known from DE'823. The motor and transmission are not shown in more detail in FIG. 3, but are symbolized by the dotted area MEB, but cf. in this respect FIGS. 15, 22, 26, 31 and 39 of DE'823.

It can be seen that this known drive unit DU specifically requires a hollow torsion measuring shaft SH to measure the rider's total torque TR, which is composed of the torque TRL applied by the rider to the left-hand pedal crank and the torque TRR applied by the rider to the right-hand pedal crank. The rider's total torque TR is passed through the hollow torsion measuring shaft SH, which is fixedly connected to the drawing-related right-hand side of the bottom bracket shaft SB, whereby the rider's total torque TR is measured, for example without contact, by means of the torque sensor ST arranged radially outside the hollow torsion measuring shaft SH. The total rider torque TR is then transmitted to the hollow output shaft SO of the drive unit DU via a rider moment coupling device in the form of a free wheel DCR.

On the hollow output shaft SO, the rider total torque TR then combines with the motor torque via a motor torque coupling device also in the form of a freewheel DCM to form a total drive torque TT. The total drive torque TT is ultimately transmitted to the chainring RC (not shown) and thus into the drivetrain 3 of the bicycle by a hollow output shaft portion SOS located in an axial portion PA of the hollow output shaft So.

It can be clearly seen in FIG. 3 that this known drive unit DU, in particular due to the hollow torsion measuring shaft SH, which is specifically re-quired for torque measurement, as well as due to the further assemblies to be arranged coaxially around the hollow torsion measuring shaft SH, sensor device ST, freewheels DCR and DCM as well as motor device MEB with electric motor and reduction gearing, has a large radial diameter, and re-quires a comparatively very large installation space overall as also stated in the introduction to the description of the present disclosure.

Figure 4:
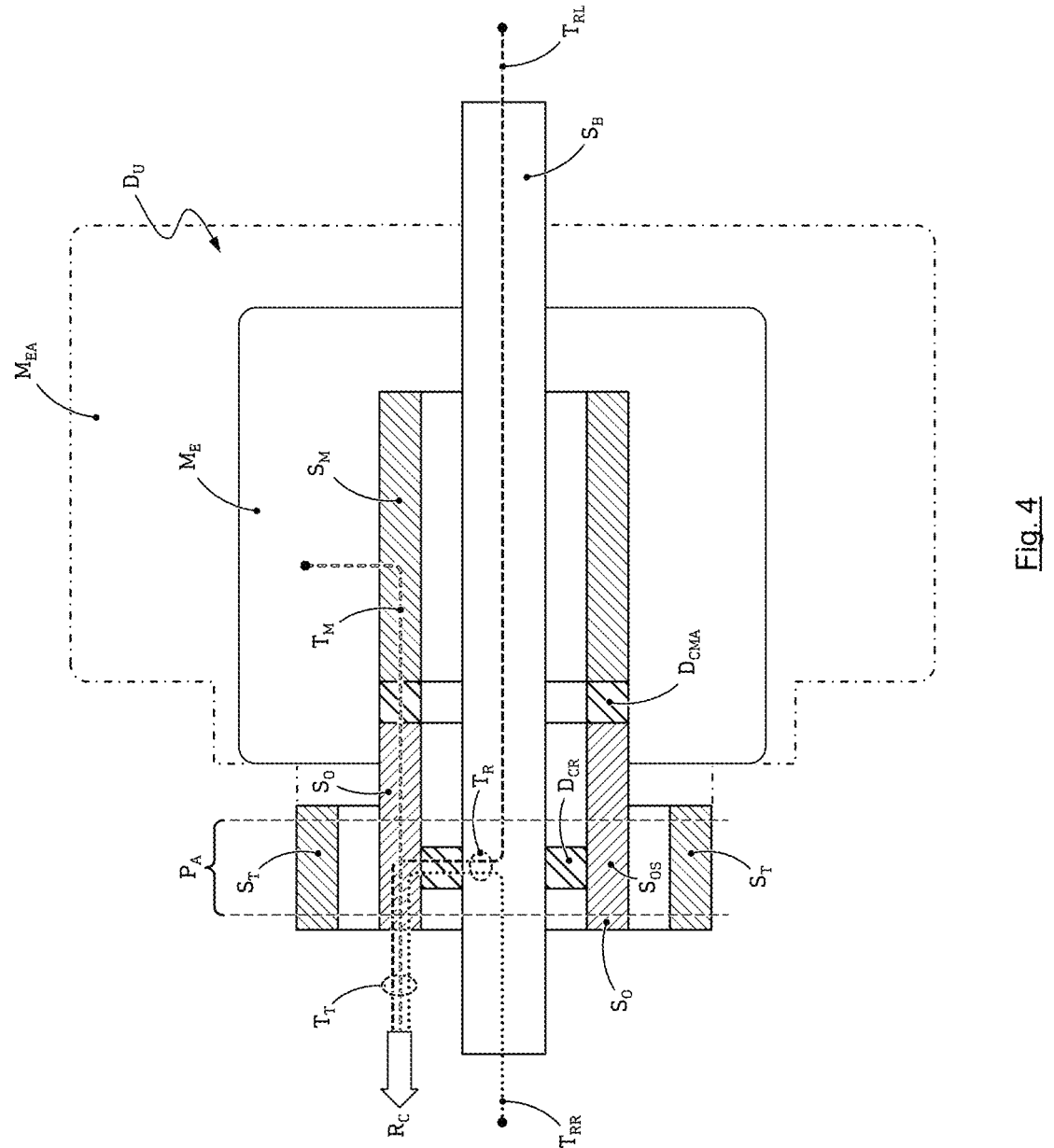
FIG. 4: shows, in a schematized representation corresponding to FIG. 3, an operating principle of a drive unit according to the present disclosure similar to the following first and fifth embodiments.

In contrast, FIG. 4 shows in a schematic representation corresponding to FIG. 3 an operating principle of a drive unit according to the present disclosure, which is similar to the following first and fifth embodiments.

First of all, the outline of the motor device MEB of the drive unit DU according to the prior art as shown in FIG. 3 is again shown as a dashed line in FIG. 4. This already shows the very large saving in installation space that is possible with the drive unit DU according to the present disclosure.

The synopsis of FIG. 4 with the prior art according to FIG. 3 further shows in particular that the solution according to the present disclosure allows to completely dispense with the hollow torsion measuring shaft SH according to FIG. 3. The hollow torsion measuring shaft SH (which is al-so usually relatively long) is required in the prior art because the torque is measured there by measuring the rotational torsional deformation of the hollow torsion measuring shaft SH by measuring corresponding torsional stresses, i.e. shear stresses running along the hollow torsion measuring shaft SH, by means of the sensor device ST coaxially surrounding the hollow torsion measuring shaft SH, from which the total driver torque TS is then determined. Only then can the driver torque TS and the motor torque TM be combined on another shaft, in this case on the hollow output shaft SO of the drive unit DU.

It can be seen that this prior art method of measuring rider torque TR results in the need for three coaxially nested hollow shafts in a central region of bottom bracket shaft SB, not counting bottom bracket shaft SB: Firstly, hollow torsion measuring shaft SH, secondly, a shaft arranged co-axially to the hollow torsion measuring shaft SH to accommodate the sensor device ST, and finally, as a third shaft located in the same axial region of bottom bracket shaft SB, the motor shaft SM.

Even though FIG. 3 is only schematic and not to scale, it is clear that this results in a comparatively large diameter of the drive device DU. In particular, the considerable instal-lation space occupied by the three coaxial hollow shafts SH, ST and SM is no longer available in the radial direction for the rotor/stator and gear unit of the motor device MEB. The motor device ME must therefore move radially outward and/or axially, which accordingly leads to a significant overall increase in the length and/or outer diameter of the drive unit DU.

This can also be seen in FIGS. 15, 22, 26, 31 and 39 of DE'823. In FIG. 15 of DE'823, reference numeral 140 designates the hollow torsion shaft SH (referred to there as the Messwelle), reference numeral 184 designates the sensor device ST (referred to there as the Spulenkorper) and reference numeral 174 designates the motor shaft SM (re-ferred to there as the Stützwelle or Rotorwelle). In the other figures of DE'823, some of these elements are not provided with reference numerals but are also clearly recognizable.

In the embodiment of the drive unit DU according to FIG. 4, the nested two shafts of the hollow torsion measuring shaft SH and the sensor device ST can be eliminated, since, according to the present disclosure, the driver torque TS can be measured in the axial portion PA of the same section SOS of the hollow output shaft SO through which the motor torque is also passed.

In the embodiment according to FIGS. 4 to 6 and 9A to 9C, this is done by passing the driver torque TR through a radial freewheel DCR arranged in the axial portion PA, which coincides with the section SOS of the hollow output shaft SO, wherein the radial freewheel DCR, when subjected to the driver torque TR, generates outward radial forces on the hollow output shaft SO, which expand the hollow output shaft SO radially outward.

This radial expansion of the hollow output shaft SO in its section SOS generates material stresses running in the direction of rotation in the hollow output shaft SO, which are measured, in an embodiment without contact, by the sensor device ST surrounding the section SOS of the hollow output shaft SO. This measurement of the driver torque TR by detecting the circumferential tensions of the hollow output shaft SO induced by a radial freewheel DCR is also not in fact impaired or appreciably falsified by the motor torque TM, which also flows through the same section SOS of the hollow output shaft SO, since the motor torque TM only generates shear stresses in the di-rection of rotation in the section SOS of the hollow output shaft SO.

The shear stresses caused by the motor torque TM in the section SOS of the hollow output shaft SO and the circum-ferential stresses caused by the driver torque TR also in the section SOS run in mutually perpendicular spatial directions and are therefore independent of each other due to the superposition principle of physics, at least in first order or approximation, which is completely sufficient for the usually required accuracy of the measurement of the driver torque TR. A higher accuracy is nevertheless possible by either measuring the motor torque TM in the motor, or by calcu-lating the motor torque TM from the motor current, and then applying a corresponding correction factor to the measured value of the driver torque TR.

In other words, in the embodiment according to FIGS. 4 to 6 and 9A to 9C, the hollow output shaft SO is also used as a hollow measuring shaft, which completely eliminates the need for the hollow torsion measuring shaft SH required in the prior art. The omission of the hollow measuring shaft SH, which is usually arranged in an axially central region of the drive unit DU, also eliminates the need to arrange the sensor device ST, which is usually also in the form of a hollow shaft, in this axially central region of the drive unit DU. Instead, the sensor device ST can be arranged axially re-mote from the motor unit ME in the section SOS of the hollow output shaft SO, which is very clearly shown in FIG. 4.

With the omission of the hollow output shaft SH accord-ing to FIG. 3, with the relocation of the sensor device ST out of the axially central area of the drive unit DU and with the measurement of the driver torque TR directly in the hollow output shaft SO, it also becomes possible to introduce the motor torque TM into the hollow output shaft SO by means of axial free-wheel DCMA, as so realized in the embodi-ments according to FIG. 4 and FIGS. 9A to 9C.

As can be clearly seen in particular in FIG. 4, the elimination of the hollow torsion measuring shaft SH made possible by the present disclosure and the likewise signifi-cantly modified positioning of the sensor device ST result in an extraordinary reduction in the installation space required by the torque sensor arrangement. The motor device ME according to FIG. 4 can thus be designed to be significantly more compact than the motor de-vice MEA in a drive unit DU known from prior art (cf. the dashed outline of the prior art motor device MEA according to FIG. 3).

On the basis of the present disclosure, electric bicycle drive units DU, in particular of the coaxial design, can thus be provided which can be de-signed to be significantly more compact and lighter than the drive units known from the prior art.

Figure 5:
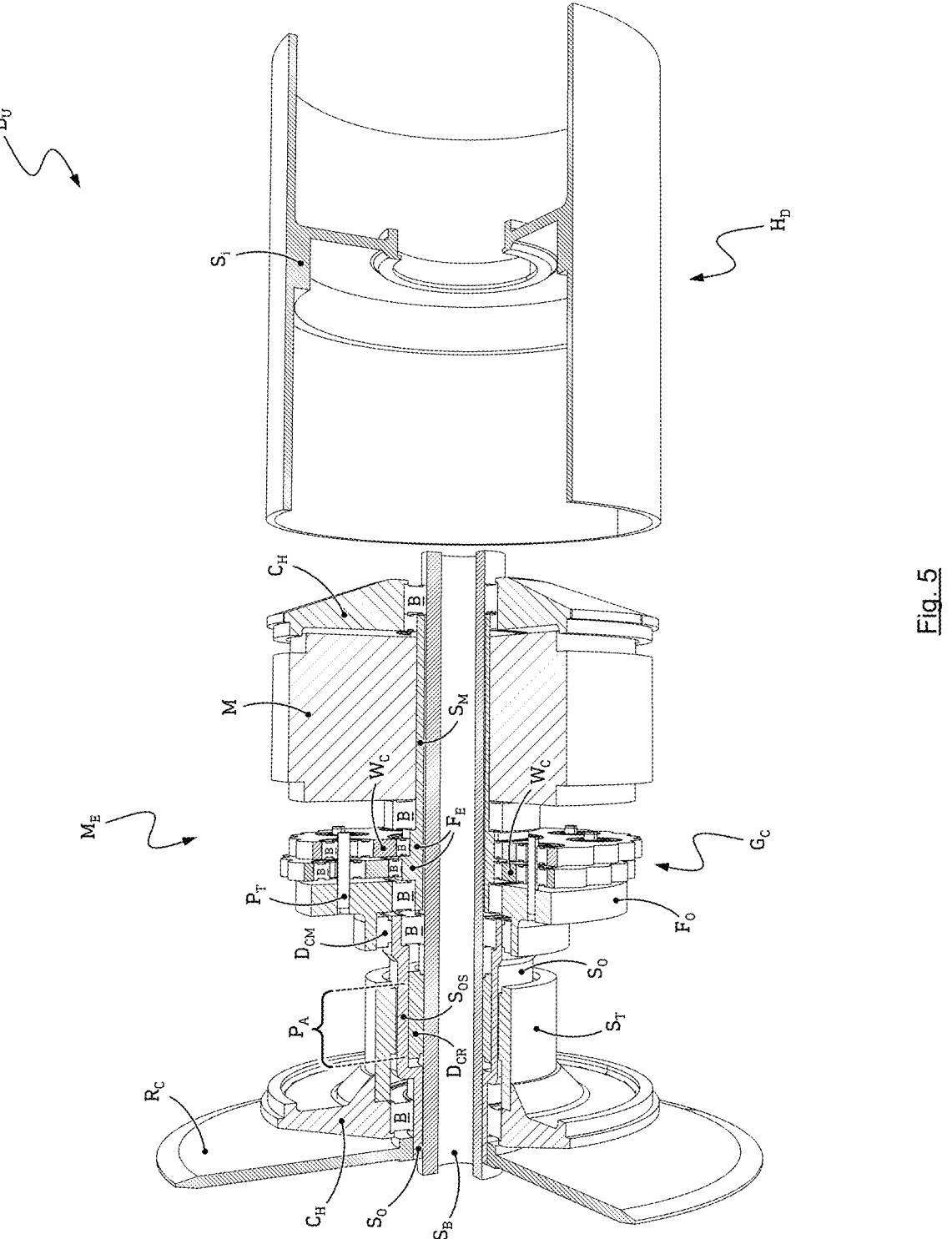
FIG. 5: shows a first embodiment of a drive unit according to the present disclosure in a cutaway perspective exploded view.

FIG. 5 shows a first embodiment of a drive unit according to the invention in a cutaway perspective exploded view. Only the drive housing SH is shown exploded or removed from the remaining components, so all other components are in their intended positions. All bearing devices or bearing positions are marked with the reference sign B.

A motor device ME can be seen, which comprises an electric motor M, which is only indicated schematically, and a reduction gearing, which is designed here as a cycloidal gear GC. The cycloidal gear GC comprises two cycloidal wheels WC, which are mounted via bearing devices B, for example ball bearings, on two bearing seats FE arranged eccentrically and rotation-ally out of phase on the motor shaft SM. The cycloidal wheels WC have cycloidal teeth or cams along their outer circumference, which engage in correspondingly formed wave-shaped teeth, not shown in FIG. 4, in an in-ternal gearing section SI of the drive housing HD, wherein the number of teeth of the internal gearing section SI is typically 1 greater than the number of teeth of the cycloidal wheels WC. This results in the very high transmission ratio typical of a cycloidal gear GC of this type.

The cycloidal wheels WC, which, due to the aforementioned ratios of the number of teeth, rotate very slowly about their own axis relative to the motor speed, communicate this rotational movement to an output flange FO via the transmission pins PT. The rotation of the output flange FO is then transmitted to the hollow output shaft SO of the drive unit DU via the motor freewheel DCM.

The rider's torque introduced via the bottom bracket shaft SB is also transmitted to the hollow output shaft SO via the rider's freewheel DCR. The combined torques of the rider and motor are then transmitted to the chainring RC and from there to the drivetrain 3 of the bicycle.

Figure 6:
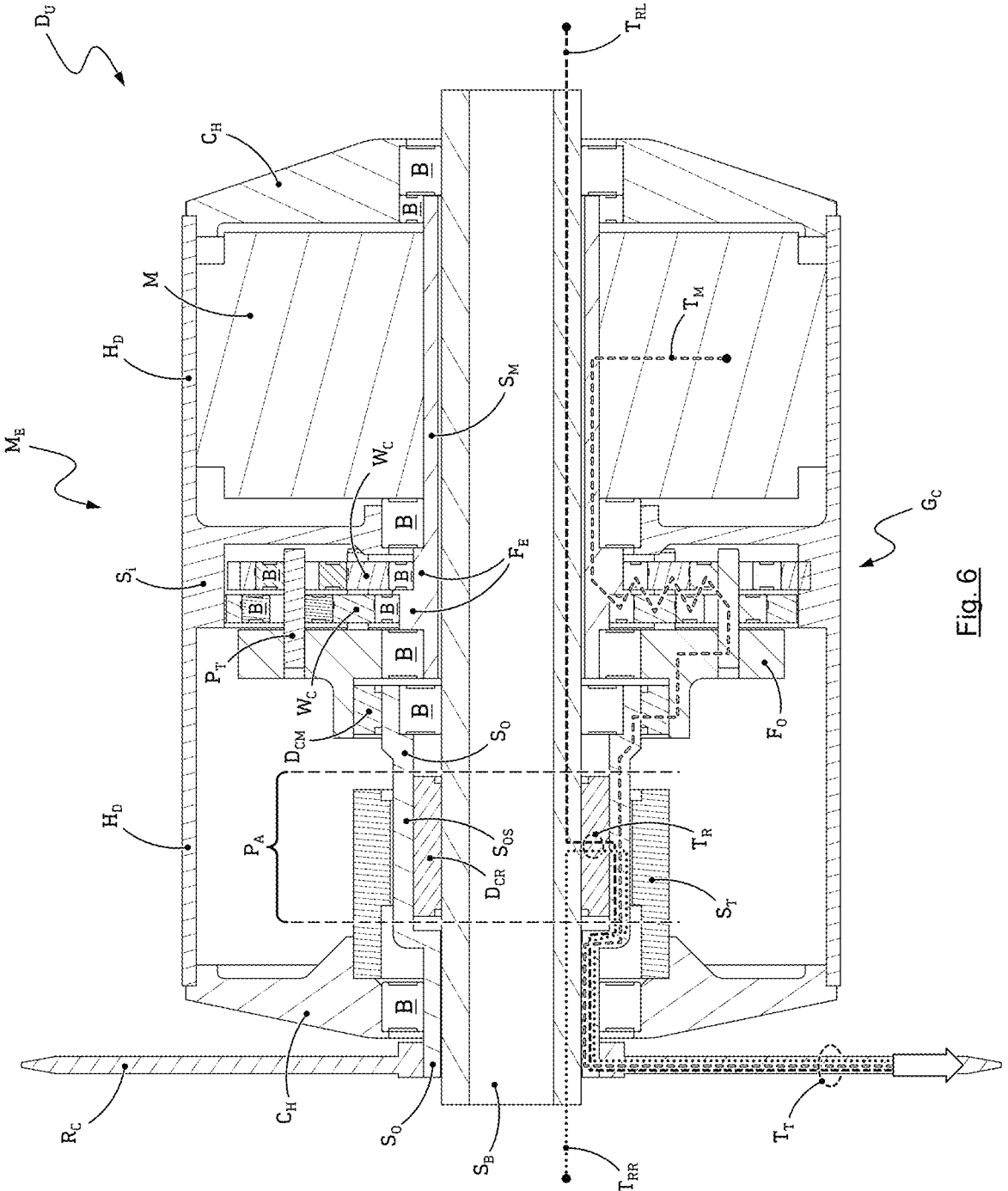
FIG. 6: shows the embodiment according to FIG. 5 in longitudinal section

FIG. 6 shows a longitudinal section of the drive unit according to FIG. 5. In addition to the assemblies and components already shown in FIG. 5, FIG. 6 also shows the courses of the left-hand rider torque TRL, the right-hand rider torque TRR and the motor torque TM. Furthermore, the axial region PA is shown, through which both the rider total torque TR and the total motor torque TM flow during operation of the drive unit.

Nevertheless, the rider total torque TR can be measured independently and at least in a first approximation uninfluenced by the motor torque TM due to the arrangement of the torque sensor device ST in the axial region PA, in which in this embodiment the rider moment coupling device, in this case the freewheel DCR for the rider torque TR, is also located.

For this measurement, the radial deformation of the hollow output shaft SO in the region of the hollow output shaft portion SOS, or the resulting material stresses running in the circumferential direction of the hollow output shaft portion SOS are measured by the sensor device ST. These material stresses occur when the rider torques TRL and TRR are passed through the rider moment coupling device DCR, which is designed, for example, as a clamping body or sprag roller freewheel DCR.

In other words, in this embodiment, circumferential stresses are at the outer diameter of the hollow output shaft portion SOS in the region of the sprag roller freewheel DCR. These material stresses running in the circumferential direction are proportional in first order to the rider torque TR, so that the sensor device ST can be calibrated by the manufacturer according to the actual rider torque TR.

The torsional or shear stresses that also occur in the hollow output shaft portion SOS, which result from the motor torque TM introduced into the hollow output shaft SO via the motor freewheel DCM and passed through the hollow output shaft SO, do not falsify the measured values for the rider torque TR, at least not to the first order or approximation, due to the superposition principle of physics. In addition, the elastic deformation due to the motor-torque-related torsional or shear stresses can be kept negligibly low by means of appropriate dimensioning of the hollow output shaft SO, compared to the considerable radial expansion of the hollow output shaft portion SOS due to the clamping body freewheel DCR.

By specifically measuring expressly only the circumferential stress by the sensor device ST, the measurement accuracy, or the isolation of the rider torque TR from the motor torque TM can be further improved. For a measurement with strain gauges, these are arranged and oriented in the circumferential direction on the hollow output shaft portion SOS so that the shear stress due to torsion is hardly included in the measurement. Equivalently, an appropriate magnetic field introduction by the sensor device ST can optimize the measurement accuracy for variants with magnetostrictive or magnetoelastic measurement.

To summarize, in this embodiment, the material deformation direction of the hollow output shaft portion SOS in the axial region PA is thus used and distinguished by the sensor device to isolate the rider torque TR from the motor torque TM during the measurement.

In order to be able to further improve the accuracy of the rider torque TR measured in this way, the motor torque can be determined approximately from the electrical power absorbed by the motor M or from the operating point of the motor M (motor torque as a function of, for example, current, voltage, speed, temperature), in order to correct any falsification of the measured value for the rider torque TR by the shear stresses of the motor torque TM, which however only occurs at a higher order.

The free space visible radially between the sensor device ST and the drive housing HD can be used for other assemblies, for example for parts of the reduction gearing GC, for electronic components such as motor and battery controllers or for energy stores.

Figure 7:
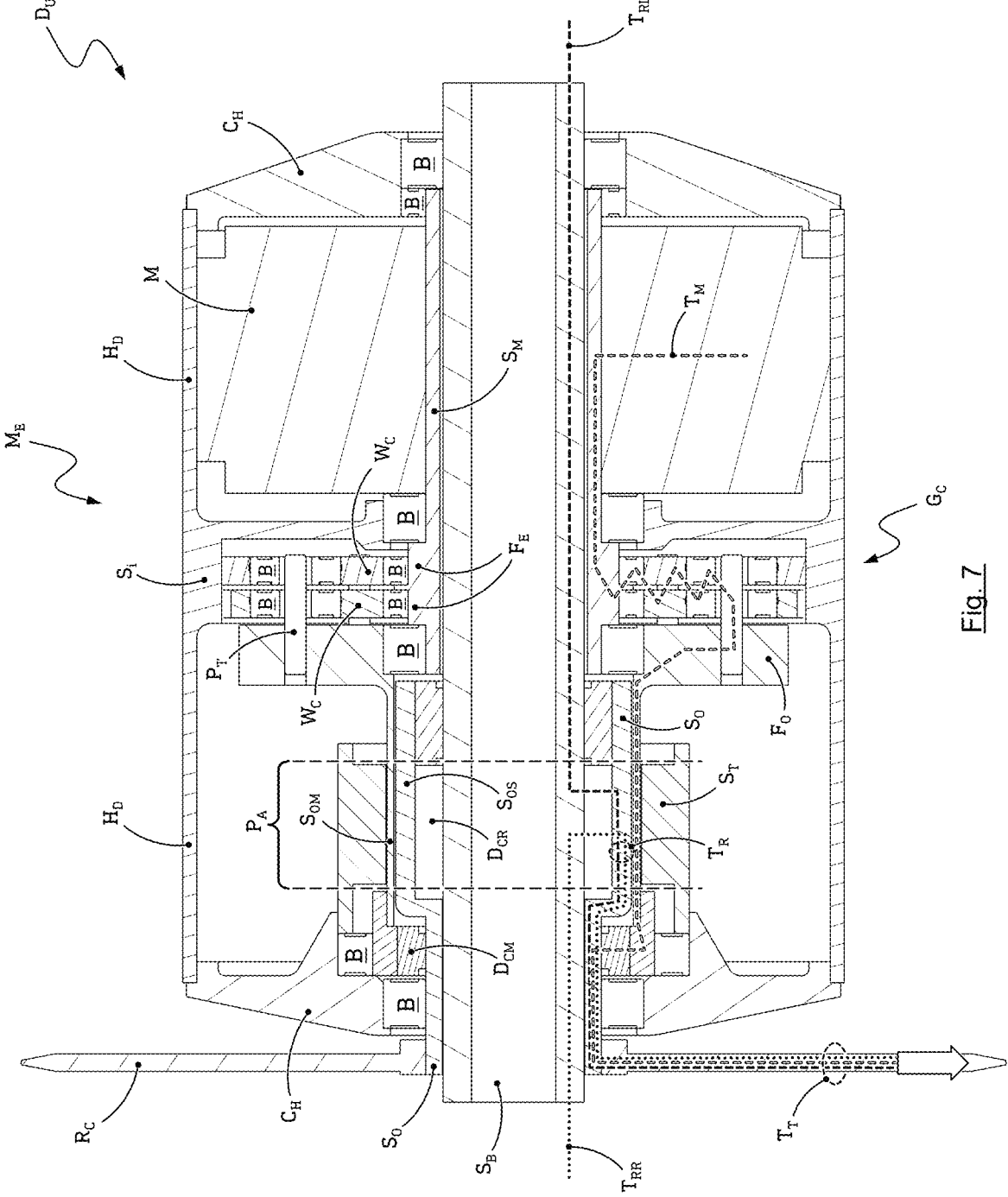
FIG. 7: shows a second embodiment in longitudinal section.

FIG. 7 shows a second embodiment of a drive unit DU in longitudinal section. In this embodiment, too, the measurement of the rider torque TR takes place in the axial region PA of the hollow output shaft SO, i.e. in the hollow output shaft portion SOS. In contrast to the embodiment according to FIGS. 4 to 6, in the embodiment according to FIG. 7 the motor torque TM is physically routed through the axial region PA separately from the rider torque TR.

For this purpose, the drive unit DU according to FIG. 7 comprises a hollow motor output shaft SOM arranged between the motor device ME and the motor torque coupling device DCM. The hollow motor output shaft SOM is arranged in the axial region PA coaxially to the hollow output shaft portion SOS and radially outside the hollow output shaft portion SOS and is configured to be permeable to magnetic fields. The permeability of the hollow motor output shaft SOM to magnetic fields in the axial region PA can be achieved, for example, by the hollow motor output shaft SOM being made of a paramagnetic material, such as aluminum, at least in the axial region PA, and in an embodiment having a comparatively low wall thickness.

This paramagnetic and optionally thin-walled portion SOM of the hollow motor output shaft is dimensioned in such a way that sufficient axial installation space is available in the axial region PA for a magnetostrictive sensor ST. In this way, the torque in the hollow output shaft portion SOS, which only consists of the rider torque TR, can be measured by means of the sensor device ST, contactless through the hollow motor output shaft SOM.

The motor torque TM is thus introduced onto the hollow output shaft SO via the motor freewheel DCM only downstream of the torque measurement (in the direction of the chainring RC) with regard to the torque flow. In this way, the rider torque TR can thus be measured completely isolated from the motor torque TM. With this arrangement, the torque measurement at the hollow output shaft SO can be measured in an axial region of the rider freewheel DCR, or also in an axial region SOS of the hollow output shaft SO which is completely or predominantly only loaded by torsion.

Figure 8:
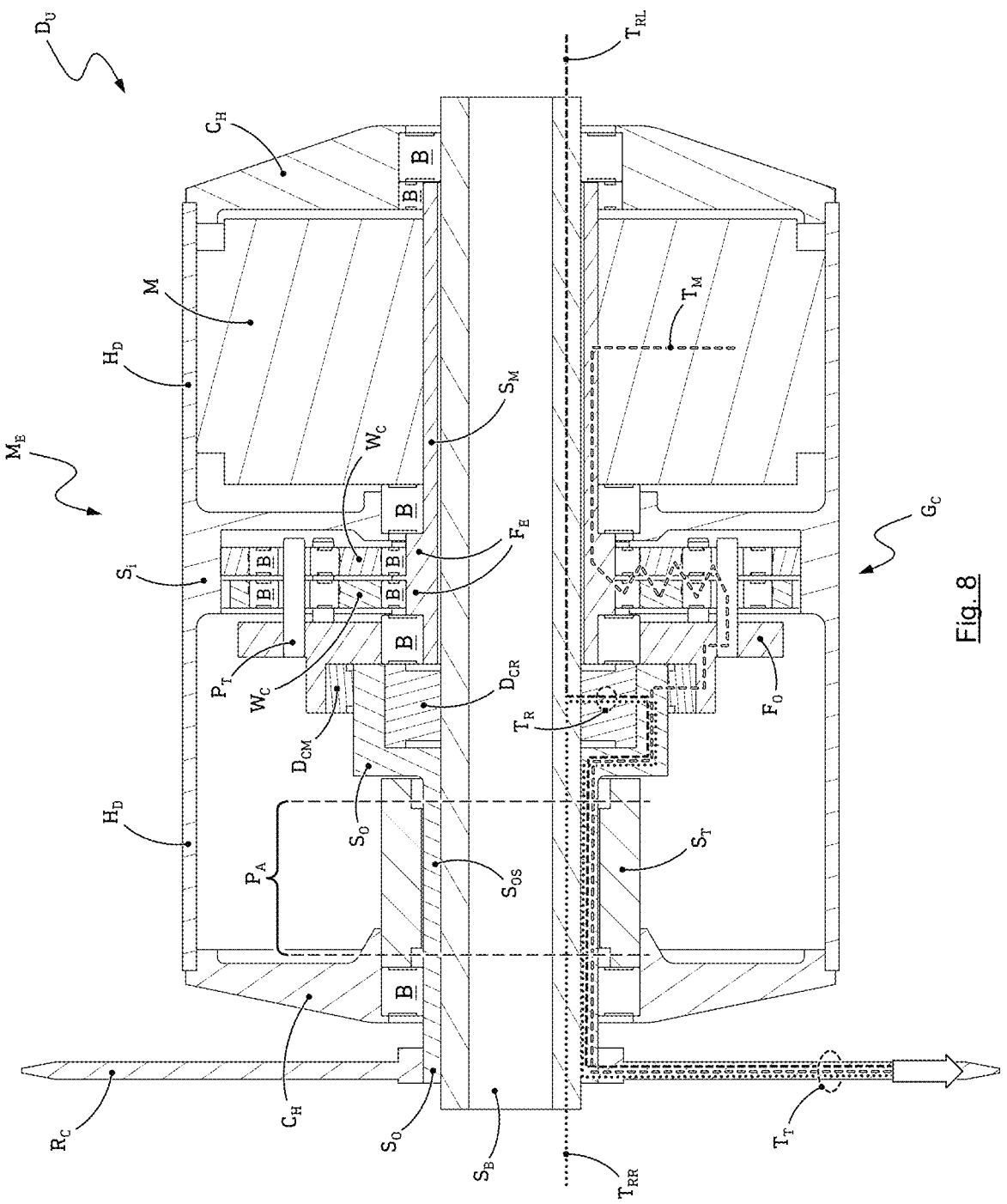
FIG. 8: shows a third embodiment in longitudinal section.

FIG. 8 shows a third embodiment of a drive unit DU in longitudinal section. In this embodiment, rider torque TR and motor torque TM are again introduced into the hollow output shaft SO via freewheels DCR and DCM respectively. In this embodiment, the torque is measured by means of a sensor device ST in the region of a hollow output shaft portion SOS, through which the total torque, i.e. the total of rider torque TR and motor torque TM, flows.

In order to be able to derive a suitable signal regarding the rider torque TR for the motor control from this measurement, the motor torque TM may be determined in real time or at very short time intervals and is subtracted from the measured total torque.

To save installation space and costs, the motor torque TM may not be measured directly, but is calculated from the electrical power absorbed by the motor. The accuracy of the determination of the rider torque TR is somewhat reduced by the calculation and subtraction of the motor torque TM but can be at least partially compensated for by the easily accessible torque measurement in the region of the hollow output shaft portion SOS.

This arrangement also allows particularly cost-effective production, so that minor compromises in the measurement accuracy of the rider torque TR can be justified.

Figures 9A, 9B, 9C:
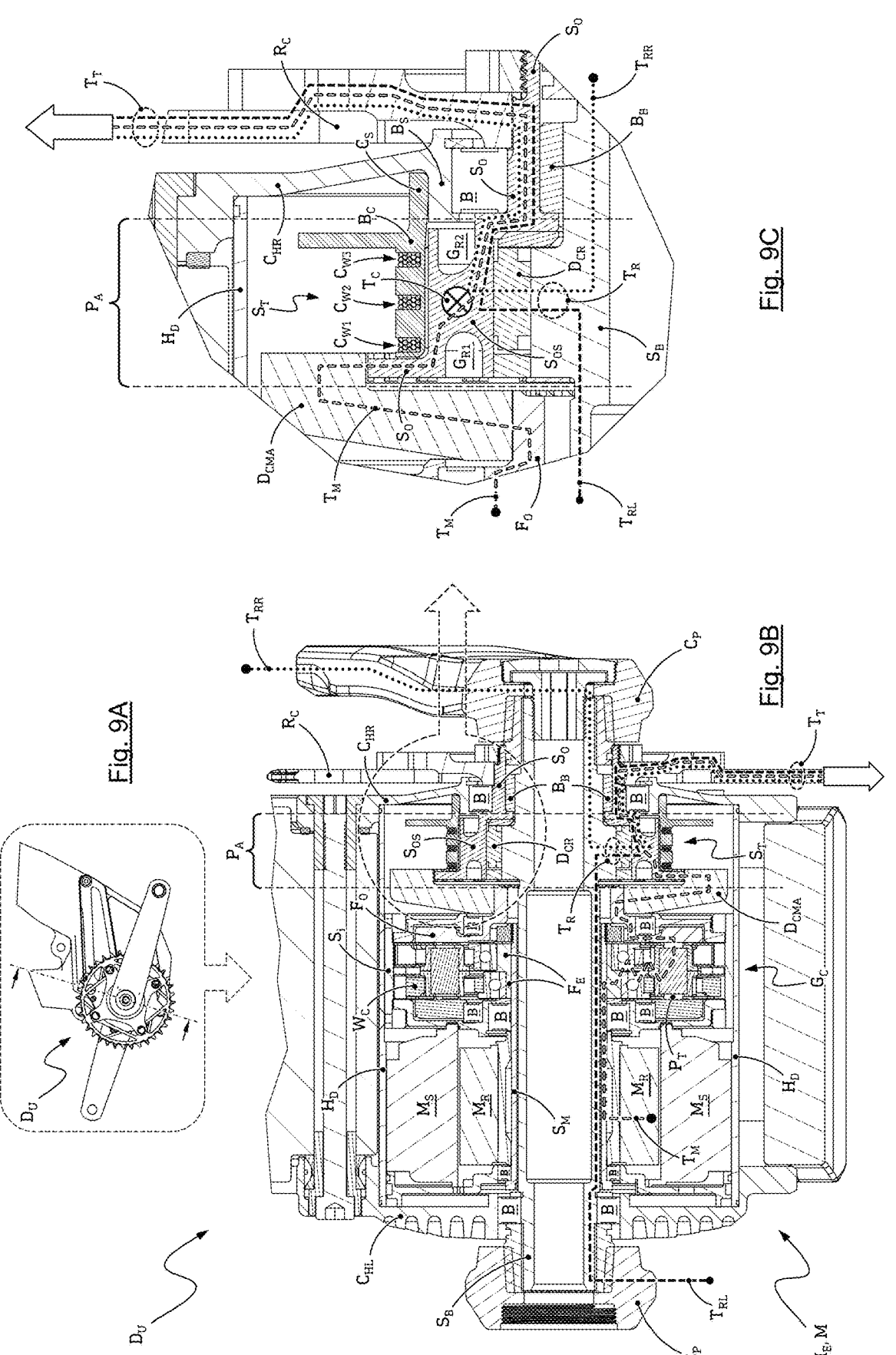
FIGS. 9A-9C: show a fourth embodiment in longitudinal section.

FIGS. 9A to 7C show a fourth embodiment of a drive unit DU according to the present disclosure in a sectional view according to FIG. 9B and an enlarged section thereof according to FIG. 9C, wherein the sectional view and the viewing direction to the section in FIG. 9A are indicated.

In contrast to the embodiments according to FIGS. 5 to 7, the drive unit DU in the illustrations of FIGS. 9A to C is installed in a bicycle frame 1, similar to the schematic illustration in FIG. 2. Furthermore, the viewing direction on the sectional plane in FIGS. 9A to C, referring to a bicycle according to FIG. 1 or 2, runs from the rear to the front, which is why the chainring RC is located on the right side in the illustrations of FIGS. 9B and 7C in relation to the drawing.

On the other hand, the chainring RC in the illustrations of FIGS. 3 to 7 is located on the left side, accordingly the viewing direction on the respective sectional plane according to FIGS. 3 to 7, referring to a bicycle according to FIG. 1 or 2, runs from the front to the rear. In other words, this means that the illustrations according to FIGS. 9B and 7C are to be read in a mirrored fashion with respect to the illustrations of FIGS. 3 to 7.

The fourth embodiment according to FIGS. 9A to C is closely based on the first embodiment according to FIGS. 4 to 6 with regard to the operating principle of the torque measurement and thus with regard to the force flows.

FIGS. 9B and 9C show the drive unit DU in longitudinal section. The courses of the left-hand driver torque TRL, the right-hand driver torque TRR and the motor torque TM are again shown by differently dashed lines. Furthermore, the axial portion PA is again shown, through which both the total driver torque TR and the total motor torque TM flow when the drive unit DU is in operation.

Just as FIGS. 5 and 6, respectively, FIGS. 9B and 7C, respectively, show a motor device ME, here with a motor stator MS, a motor rotor MR, and a motor shaft SM.

The motor shaft SM acts on a cycloidal gear unit GC, which comprises eccentric bearing seats FE rotating in a phase-shifted manner together with the motor shaft SM, external toothed cycloidal wheels WC, meshing with an internal gearing section Si of drive housing HD, furthermore transmission pins PT, and an output flange FO.

Due to the system-specific high transmission ratio range of cycloidal transmissions, the single-stage cycloidal transmission GC is sufficient for the required reduction of the comparatively high speed of a motor rotor MR down to the comparatively low speed of a chainring RC on a bicycle drivetrain 3.

From the output flange FO of the cycloidal transmission GC, the motor torque TM flows via a motor freewheel DCMA into the hollow output shaft SO, where the motor torque TM combines with the rider torque TR. motor torque TM and rider torque TR are transmitted from there together to the chainring RC and thus to the drive train 3 (see FIG. 1) of the bicycle. In this embodiment, the hollow output shaft SO is rotatably mounted on the right-hand side of the bottom bracket shaft by means of a bearing bushing BB. FIG. 9C shows an enlarged section of FIG. 9B, in particular the axial portion PA, through which, also in this embodiment, both the total driver torque TR and the total motor torque TM flow during operation of the drive unit DU.

Following the power flow of motor torque TM and total driver torque TR in FIG. 9C from left to right, one first recognizes the motor freewheel DCMA, which is visualized here only in schematic block representation, in particular without reproduction of freewheel bodies or the like, the concrete de-sign of which is also without significance for the subject matter of this dis-closure. In an embodiment, however, the motor freewheel DCMA is an axial free-wheel, which contributes to being able to design the drive unit DU in a particularly space-saving manner, cf. the above-described synopsis of the embodiment according to FIG. 4, which also has an axial freewheel DCMA, with the prior art according to FIG. 3.

In the embodiment according to FIGS. 9A to 9C, the motor freewheel DCM, similar to the embodiments according to FIGS. 4 to 6, directs the output torque of the cycloidal gear unit GC from the cycloidal gear unit output flange FO to a hollow output shaft portion SOS, which defines the axial portion PA in which the torque sensor device ST is arranged.

Both the driver's total torque TR and the motor torque TM pass through the axial portion PA and the hollow output shaft portion SOS located there, up to there just like in the prior art according to FIG. 3.

According to the present disclosure, however, the magnitude of the driver total torque TR, unlike in the prior art according to FIG. 3, is measured directly in the axial portion PA and in the hollow output shaft portion SOS located there, which is passed through by both the driver total torque TR and the motor torque TM.

This can be seen clearly in FIG. 9C in particular. There, the driver total torque TR and the motor torque TM are bundled in the hollow output shaft portion SOS of the hollow output shaft SO and flow together through this hollow output shaft portion SOS of the hollow output shaft SO. In the pre-sent embodiment according to FIGS. 9A to 9C, the driver's total torque TR also is measured independently of the motor torque TM, which flows through the same material cross section of the hollow output shaft SO in the hollow output shaft portion SOS as the driver's total torque TR.

This is achieved similarly to the embodiment according to FIGS. 4 to 6 in that the rider moment coupling device DCR (i.e. the rider moment free-wheel, which permits motor drive of the hollow output shaft and thus of the bicycle drivetrain 3 even if the rider does not operate the pedals and the bottom bracket shaft SB is thus stationary) is arranged in the axial portion PA and radially inside the hollow output shaft SO and is designed, for example, as a sprag roller freewheel DCR.

As soon as the rider applies a rider torque TRR or TRL to the bottom bracket shaft SB via the pedal cranks CP, the pedal cranks CP and the bottom bracket shaft SB start to rotate, activating the sprag roller freewheel DCR and causing it to start closing.

This closing of the sprag roller freewheel DCR always occurs when the bot-tom bracket shaft SB rotates faster than the motor or gearbox output flange FO and thus faster than the hollow output shaft SO. However, this initial difference in the rotational speed of the bottom bracket shaft SB and hollow output shaft SO is always a prerequisite for a rider torque to be introduced into the drivetrain 3 at all and is always present when the rider is actively pedaling, or pedaling with a certain force.

Due to the then closed sprag roller freewheel DCR, the driver's total torque TR is then passed through the sprag roller freewheel DCR. Due to the clamping of the freewheel bodies (not shown but known from prior art) between the freewheel inner ring and the freewheel outer ring, considerable forces are generated in the clamping roller freewheel in a radially out-ward direction. These forces are transmitted to the hollow output shaft portion SOS, causing it to expand elastically in the axial direction. This in turn induces material stresses which run in the circumferential direction of the hollow output shaft portion SOS.

These material stresses running in the circumferential direction of the hollow output shaft portion SOS are sym-bolized in FIG. 9C by the symbol TC of an arrow pointing into the drawing plane. The measurement of these material stresses TC is carried out by the sensor device ST, in an embodiment contact-free. In this way, as well as due to the above-explained superposition principle between the mate-rial stresses TC running in the circumferential direction and the shear stresses generated by the motor torque TM in the hollow output shaft portion SOS, the driver torque TR can be determined by the sensor device ST with high accuracy and independently other motor torque TM.

As can be seen in FIG. 9B and in the enlarged sectional view of FIG. 9C, the sensor device ST comprises a coil bobbin BC, which in the embodiment shown carries three measuring coils CW1, CW2 and CW3.

The structure, operating principle and processing elec-tronics of the sensor device ST shown in FIGS. 9B and 9C are not subject of the present dis-closure, but are subject of the unpublished patent application U.S. 63/286,370 (US'370). The disclosure of this U.S. patent application US'370 is incorporated by reference into the disclosure of the present pa-tent application, thereby disclosing combina-tions of sensor device ST according to the disclosure of US'370 with the features, embodiments, and advantages of arranging such sensor device ST in an electric bicycle drive unit DU set forth in the present disclosure.

Of the three measuring coils CW1, CW2 and CW3, the drawing-related left-hand measuring coil CW1 is used to detect the change in magnetic fields in the hollow output shaft portion SOS, in order to infer the material stresses in the hollow output shaft portion SOS. The drawing-related middle measuring coil CW2 serves to excite eddy currents and/or magnetic fields in the hollow output shaft portion SOS. In accordance with the theory of magnetoelasticity, there are dependencies between mechanical and magnetic properties in ferromagnetic materials, as in the present case with the hollow output shaft portion SO, which, in an embodiment, is made of steel. The magnetic properties of the hollow output shaft portion SOS change under mate-rial loads and associated geometric deformations (in this case the radial expansion of the hollow output shaft portion SOS).

The drawing-related left-hand measuring coil CW1 detects the changes caused by the tensions or deformations of the hollow output shaft portion in the currents or magnetic fields induced by the drawing-related middle measuring coil CW2 in the hollow output shaft portion SOS. The drawing-related right-hand measuring coil CW3 is used for tempera-ture compensation of the measurement. This is necessary because temperature fluctuations of the order of 100 K can occur in the region of the sensor device ST, in particular due to the heat generation of the electric motor M, MS, MR.

It is particularly advantageous if the measuring coils CW1, CW2, CW3, as shown in FIGS. 9B and 9C, are in the form of windings which run in a circumferential direction. In this way, the coil bobbin BC with coils CW1, CW2, CW3 can be manufactured rather simply and inexpensively, and the sensor device ST can also withstand demanding loads and associated vibrations or temperature stresses. The details of the manufacture and de-sign of the measuring coils CW1, CW2, CW3 as well as their circuitry and processing electronics are subject of the aforementioned US application US'370, the disclosure of which is incorporated by reference into the dis-closure of the present patent application.

In the embodiment shown, the hollow output shaft portion SOS has two circumferential recess grooves GR1 and GR2. The presence and/or the choice of the size and geometric shape of one or both recess grooves GR1 and GR2 influ-ences the characteristic curve of the measurement by the sensor device ST. In particular, the sensitivity and accuracy of the measurement of the driver torque TR by the sensor device ST can be optimized by suitable selection and for-mation of one or both recess grooves GR1 and GR2.

In the embodiment shown in FIGS. 9B and 9C, the coil bobbin BC is arranged on a left-hand inner-side projection BS of the right-hand housing cover CHR formed by the bearing seat of the bearing BR of the hollow output shaft SO. This arrangement is advantageous due to the thus provided dual use of the bearing seat projection BS and has the further advantage that any deformations of the bottom bracket shaft and/or the housing cover CHR occurring during operation of the drive unit DU due to the high chain tensile forces or pedal forces are also communicated to the coil bobbin BC. This ensures that the coil bobbin BC remains largely coaxial with the measuring body, i.e. with the hollow output shaft portion SOS, even when the drive unit DU is subjected to high loads.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be mini-mized. Accordingly, the disclosure and the figures are to be regarded as illustrative rather than restrictive.

While this specification contains many specifics, these should not be construed as limitations on the scope of the invention or of what may be claimed, but rather as descrip-tions of features specific to particular embodiments of the invention. Certain features that are described in this speci-fication in the context of separate embodiments can also be implemented in combination in a single embodiment. Con-versely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. More-over, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electric bicycle drive unit for arrangement in a bottom bracket region of a bicycle frame, the drive unit comprising:
   a torque sensor device,
   a bottom bracket shaft,
   an electric motor device arranged coaxially to the bottom bracket shaft,
   a hollow output shaft transmitting a motor torque and a rider total torque to a bicycle drivetrain, and
   a rider moment coupling device arranged between the bottom bracket shaft and the hollow output shaft for transmitting the rider total torque between the bottom bracket shaft and the hollow output shaft, and
   a motor torque coupling device arranged between the electric motor device and the hollow output shaft for transmitting the motor torque to the hollow output shaft,
   wherein an axial region of the hollow output shaft is configured to transmit both the rider total torque and the motor torque, wherein the torque sensor device defines an axial extent of the axial region and is arranged therein.

2. The drive unit of claim 1, wherein the rider moment coupling device is arranged in the axial region and radially inside the hollow output shaft, the torque sensor device being configured to detect a change in diameter or a circumferential stress of the hollow output shaft and/or the rider moment coupling device in the region of the hollow output shaft portion.

3. The drive unit of claim 1, further comprising a hollow motor output shaft arranged between the motor device and the motor torque coupling device, the hollow motor output shaft being arranged in the axial region coaxially to the hollow output shaft portion and radially outside the hollow output shaft portion and is configured to be permeable to magnetic fields, the torque sensor device being designed for contactless detection of the rider total torque in the hollow output shaft portion.

4. The drive unit of claim 1, wherein the torque sensor device is configured to measure a total torque comprising the rider total torque and the motor torque, and wherein the rider total torque is determined by calculating a difference between the total torque and the motor torque.

5. The drive unit of claim 1, wherein the motor device (ME) comprises a cycloidal gear unit or expansion shaft gear unit.

6. The drive unit of claim 1, wherein the sensor device comprises a coil arrangement for detecting material stress-dependent or deformation-dependent magnetostrictive or magnetoelastic properties of the hollow output shaft portion.

7. The drive unit of claim 6, wherein at least one coil of the coil arrangement is formed by wire windings extending substantially along a circumferential direction with respect to the bottom bracket shaft.

8. The drive unit of claim 7, wherein all of the coils of the coil arrangement are formed by wire windings extending substantially along a circumferential direction with respect to the bottom bracket shaft.

* * * * *